United States Patent
Fitzpatrick et al.

(10) Patent No.: US 11,468,470 B1
(45) Date of Patent: Oct. 11, 2022

(54) PROCESS AND SYSTEM FOR DIGITAL LEAD SOURCING

(71) Applicant: Force Events and Direct Marketing, LLC, Atlanta, GA (US)

(72) Inventors: John Fitzpatrick, Atlanta, GA (US); Randy Sieger, Atlanta, GA (US); Alex Appolloni, Atlanta, GA (US)

(73) Assignee: Force Events and Direct Marketing, LLC, Atlanta, GA (US)

(*) Notice: Subject to any disclaimer, the term of this patent is extended or adjusted under 35 U.S.C. 154(b) by 891 days.

(21) Appl. No.: 14/860,066

(22) Filed: Sep. 21, 2015

Related U.S. Application Data

(60) Provisional application No. 62/052,942, filed on Sep. 19, 2014.

(51) Int. Cl.
*G06Q 30/00* (2012.01)
*G06Q 30/02* (2012.01)

(52) U.S. Cl.
CPC ..... *G06Q 30/0246* (2013.01); *G06Q 30/0277* (2013.01)

(58) Field of Classification Search
CPC . G06Q 30/00; G06Q 30/0246; G06Q 30/0277
USPC .............................................. 705/14.1–14.73
See application file for complete search history.

(56) References Cited

U.S. PATENT DOCUMENTS

| | | | | |
|---|---|---|---|---|
| 9,152,727 B1* | 10/2015 | Balducci | ............... | G06F 16/955 |
| 2004/0103024 A1* | 5/2004 | Patel | ...................... | G06Q 30/02 |
| | | | | 705/14.53 |
| 2009/0327032 A1* | 12/2009 | Gunawardana | .... | G06Q 30/0243 |
| | | | | 705/14.42 |
| 2011/0055021 A1* | 3/2011 | Haag | ...................... | G06Q 30/02 |
| | | | | 705/14.69 |
| 2011/0125593 A1* | 5/2011 | Wright | .................... | G06Q 30/02 |
| | | | | 705/14.73 |
| 2011/0231240 A1* | 9/2011 | Schoen | .............. | G06Q 30/0242 |
| | | | | 705/14.41 |
| 2013/0346199 A1* | 12/2013 | Brook | ................ | G06Q 30/0255 |
| | | | | 705/14.53 |

FOREIGN PATENT DOCUMENTS

WO    WO2012054185    *    4/2012    ............. G06F 17/30

OTHER PUBLICATIONS

User Response Prediction in Online Advertising, Zhabiz Gharibshah, Feb. 23, 2021, p. 39 (Year: 2021).*

* cited by examiner

*Primary Examiner* — John Van Bramer
*Assistant Examiner* — Darnell A Pouncil
(74) *Attorney, Agent, or Firm* — Morris, Manning & Martin, LLP; Daniel E. Sineway, Esq.; Daniel T. Begasse

(57) ABSTRACT

Aspects of the present disclosure generally relate to systems and methods for attributing online advertising campaigns to in-store purchases. In particular embodiments, the system is configured for: 1) receiving and optimizing advertising campaign information; 2) uploading the optimized advertising campaign information to an advertising platform; 3) capturing customer data based on pixel and cookie interaction, including data regarding the advertising campaign; 4) receiving customer identifying information; 5) matching the customer identifying information to the captured customer data; and 6) matching the customer identifying information to in-store purchases.

15 Claims, 3 Drawing Sheets

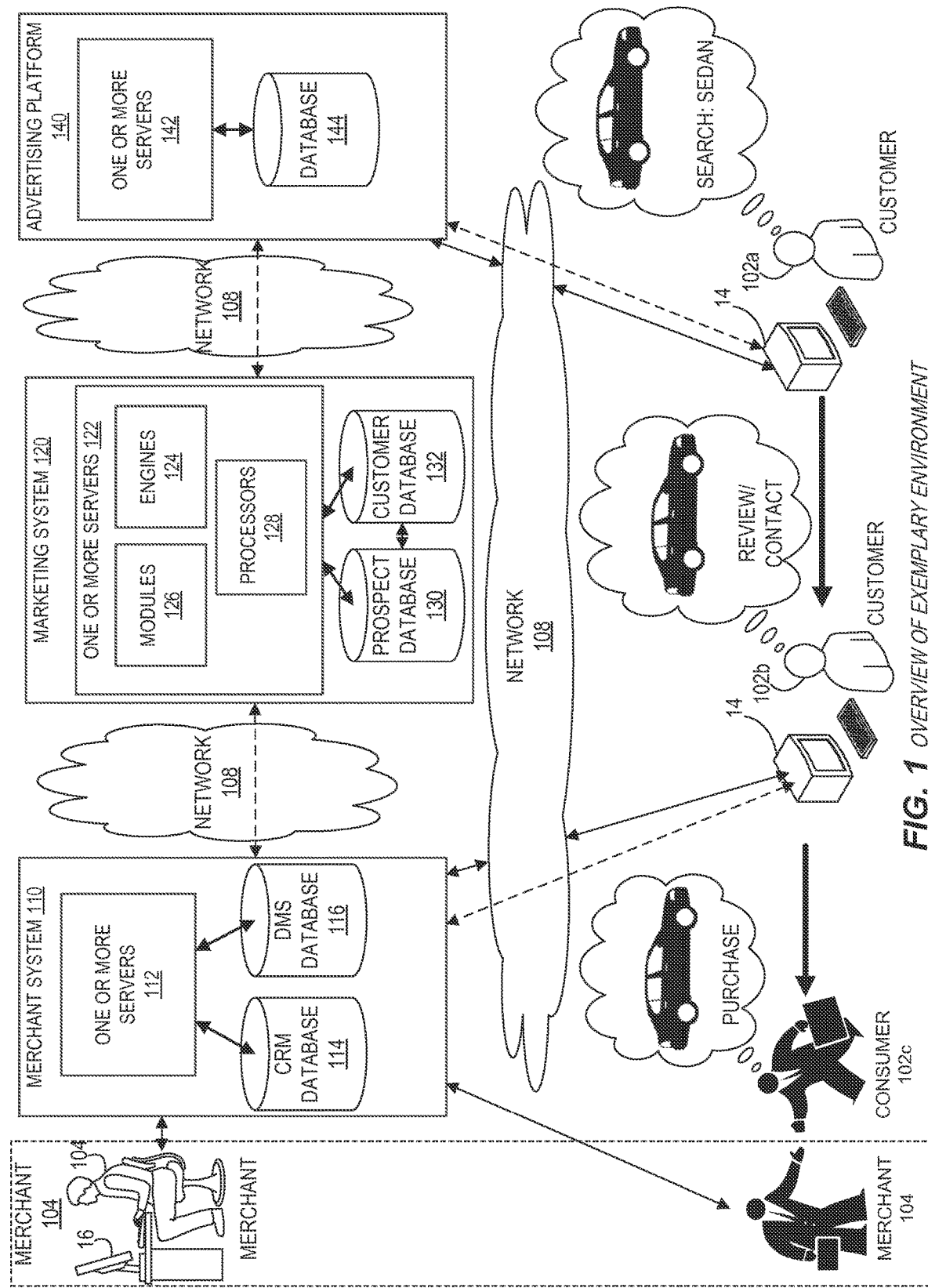
*FIG. 1* OVERVIEW OF EXEMPLARY ENVIRONMENT

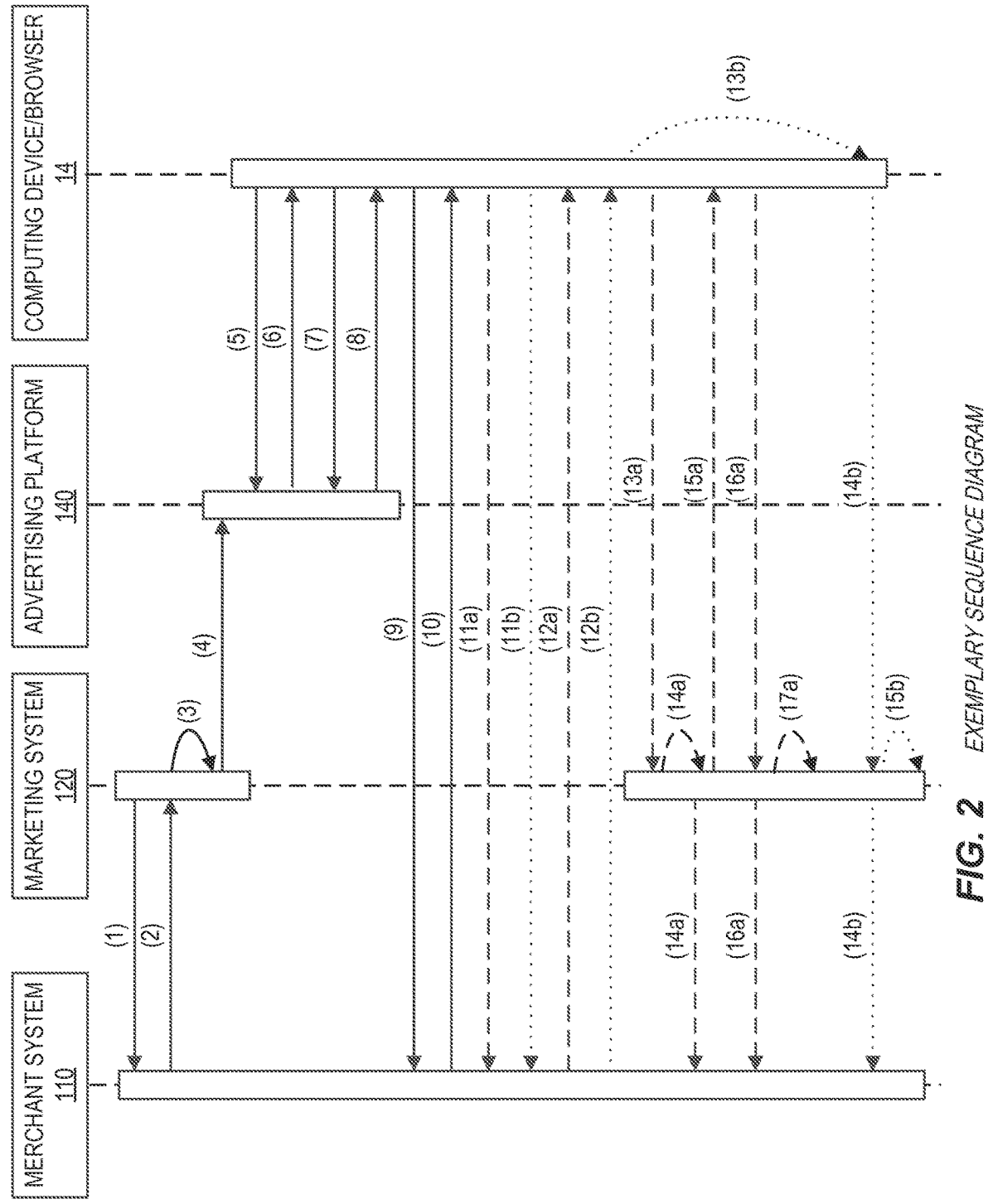
FIG. 2  EXEMPLARY SEQUENCE DIAGRAM

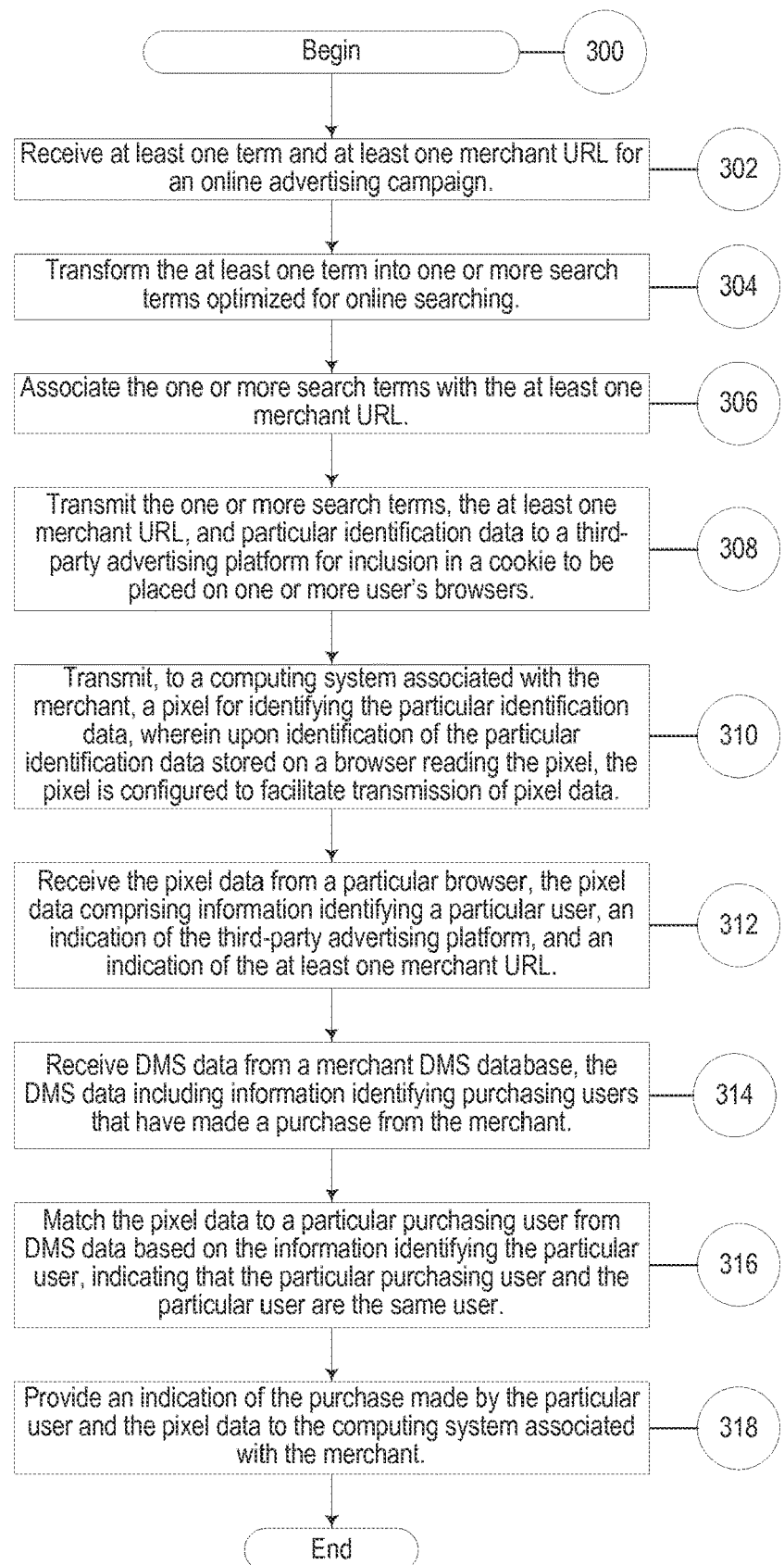
FIG. 3   EXEMPLARY FLOWCHART

PROCESS AND SYSTEM FOR DIGITAL LEAD SOURCING

CLAIM OF PRIORITY

This application claims the benefit of and priority to U.S. Provisional Patent Application No. 62/052,942, filed Sep. 19, 2014, entitled, "PROCESS AND SYSTEM FOR DIGITAL LEAD SOURCING," which is incorporated herein by reference in its entirety.

BACKGROUND

Online advertising is a popular way for merchants to deliver marketing messages. In particular, through various methods, merchants can deliver online advertisements that are targeted to specific potential customers based on the potential customers' online information (what websites they have visited, etc.), geographic location, etc. Further, merchants, in some cases, can attribute online purchases to online advertising campaigns by, for example, reading a cookie that identifies an advertising campaign with which a customer has engaged prior to making an online purchase.

However, while online advertising is popular, the majority of sales are still made in brick and mortar store locations, and attributing online advertising to brick and mortar sales can be challenging. Thus, it can be difficult for merchants (and marketers) to gauge how effective their advertising may be. Therefore, there is a long-felt but unresolved need for a system or method for attributing online advertising campaigns with brick and mortar (in-store) purchases. Various embodiments of the present systems and methods recognize and address the foregoing considerations.

BRIEF SUMMARY OF THE DISCLOSURE

Aspects of the present disclosure generally relate to systems and methods for attributing advertising campaigns to in-store purchases. In at least one aspect, the systems and methods disclosed herein provide information attributing in-store sales to customer interactions with advertising campaigns. In further aspects, the systems and methods herein identify advertising campaigns that convert to a customer purchase.

According to particular aspects, a computer system for linking purchases at a physical location with an online marketing campaign, the computer system comprising: A) at least one database for storing online advertising campaign information; and B) at least one processor operatively connected to: a) the at least one database, b) a third-party online advertising platform, c) a merchant database, and d) a computing system associated with a merchant, wherein the at least one processor is operative to: i) receive at least one term and at least one merchant URL for an online advertising campaign; ii) transmit, to the computing system associated with the merchant, a pixel for identifying the particular identification data, wherein upon identification of the particular identification data stored on a browser reading the pixel, the pixel is configured to facilitate transmission of pixel data to the at least one processor; iii) receive the pixel data from a particular browser, the pixel data comprising information identifying a particular user, an indication of the third-party advertising platform, and an indication of the at least one merchant URL; iv) receive data from the merchant database, the data including information identifying purchasing users that have made a purchase from the merchant; v) match the pixel data to a particular purchasing user from the data based on the information identifying the particular user, indicating that the particular purchasing user and the particular user are the same user; and vi) provide an indication of the purchase made by the particular user and the pixel data to the computing system associated with the merchant.

According to some embodiments, a method for linking purchases at a physical location with an online marketing campaign, the method comprising: A) providing at least one database for storing online advertising campaign information; and B) providing at least one processor operatively connected to: a) the at least one database, b) a third-party online advertising platform, c) a merchant database, and d) a computing system associated with a merchant, wherein the at least one processor is operative to: i) receive at least one term and at least one merchant URL for an online advertising campaign; ii) transmit, to the computing system associated with the merchant, a pixel for identifying the particular identification data, wherein upon identification of the particular identification data stored on a browser reading the pixel, the pixel is configured to facilitate transmission of pixel data to the at least one processor; iii) receive the pixel data from a particular browser, the pixel data comprising information identifying a particular user, an indication of the third-party advertising platform, and an indication of the at least one merchant URL; iv) receive data from the merchant database, the data including information identifying purchasing users that have made a purchase from the merchant; v) match the pixel data to a particular purchasing user from the data based on the information identifying the particular user, indicating that the particular purchasing user and the particular user are the same user; and vi) provide an indication of the purchase made by the particular user and the pixel data to the computing system associated with the merchant.

These and other aspects, features, and benefits of the claimed systems and methods(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 1 is an exemplary system environment, according to one embodiment of the present disclosure.

FIG. 2 is an exemplary sequence diagram of an exemplary sequence of data transmissions between various components of the exemplary system environment of FIG. 1, according to one embodiment of the present disclosure.

FIG. 3 is an exemplary flowchart of an exemplary process of the systems and methods herein according to one embodiment of the present disclosure.

DETAILED DESCRIPTION

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates.

Overview

Aspects of the present disclosure generally relate to systems and methods for attributing advertising campaigns to in-store purchases. In at least one aspect, the systems and methods disclosed herein provide information attributing in-store sales to customer interactions with advertising campaigns. In further aspects, the systems and methods herein identify advertising campaigns that convert to a customer purchase.

In one aspect, the disclosed systems and methods include a merchant (e.g., car dealership) setting up a digital adverting campaign that includes serving online advertisements to potential customers. These adverting campaigns, in various embodiments, include urchin tracking modules (UTM) for tracking, websites utilizing pixels to transmit various data to a marketing system, including tracking data, electronic form submission data, call data, chat data, date/time data, etc. UTM tracking may be used for, for example, pay per click (PPC), search engine marketing (SEM), search engine optimization (SEO), ad retargeting, video pre-roll, and/or email.

According to particular embodiments, the systems and methods disclosed herein include: 1) transmitting a pixel to a merchant for inclusion in the merchant's websites, the pixel for facilitating transmission of potential customer data to a marketing platform based on the code associated with the pixel identifying specific information included in a cookie on a browser; 2) uploading advertising campaign data to an advertising platform, the advertising campaign data including the specific information to be identified by the pixel; 3) receiving tracking data, form submission data, call data, and advertising campaign data based on the pixel identifying the specific information included in a cookie associated with (e.g., dropped on) a potential customer's browser by the advertising platform (e.g., when the potential customer visits the merchant's website); 4) receiving data from the merchant regarding sales and the identification of customers who have made purchases; and 5) matching the tracking data, form submission data, call data, and/or advertising campaign data to a customer that has made a purchase at the merchant based on identifying information included in the form submission data (name, phone number, address, etc.) and corresponding information of a customer that has made purchase (e.g., the customer fills out their name, address, phone number, etc. when making a purchase and this information is loaded into the merchant's system).

More particular detail regarding the above systems and methods are discussed herein. Various embodiments, associated features and functionalities will be better understood from the discussions that follow.

Exemplary Embodiment

Exemplary System Environment
Turning now to the figures, FIG. 1 is an overview of an exemplary environment of one embodiment of the systems and methods herein. In particular, FIG. 1 depicts a particular example where a customer (potential customer) 102 searches for a car to purchase, researches the car, and purchases the car. Further, FIG. 1 depicts how various systems in this environment interact in at least one embodiment of the systems and methods described herein.

As shown in FIG. 1, a merchant 104 (a car dealer in this particular example) interacts with a merchant system 110. The merchant system 110, in the embodiment shown, includes a customer relationship management (CRM) database 114 (for storing leads) and document management system (DMS) database 116 (for storing information regarding sales). In various embodiments, the CRM database 114 and the DMS database 116 do not share information. The merchant system 110, in the embodiment shown, is operatively connected to a marketing system 120, which is operatively connected to an advertising platform 140 (a search engine in this particular example, e.g., Google® or Bine). As shown in FIG. 1, the customer 102 interacts with these different systems throughout this particular example. Further, as shown, the various components of this exemplary environment are operatively connected via one or more networks 108.

The particular example begins with the merchant 104 creating an advertising campaign. In this particular example, the advertising campaign includes an online advertisement and a search term, where the search term is a term that is to be matched to a potential customer's search query (e.g., customer 102) and, upon matching the term to the search query, an advertising platform (e.g., advertising platform 140) displays the advertisement. In this particular example, the search term is "midsized car." As will be further discussed herein, the merchant 104 may create any suitable advertising campaign and may include any number of search terms, key words, etc.

The merchant 104, in this particular example, via the merchant system 110, transmits the advertising campaign to the marketing system 120. The marketing system 120, in this particular example, optimizes the search term of the advertising campaign (e.g., expands the search term in to one or more terms, creates new search terms related to the search term, etc.), associates the optimized search term (or terms) with the advertisement, adds a particular identifier (to be read by a pixel, as further discussed below) to the advertising campaign, and uploads or otherwise transmits the advertising campaign to the advertising platform 140 to deliver the advertisement to potential customers when the customers search for the optimized search term on the advertising platform 140. In this particular example, the marketing system 120 transforms the search term "midsized car" into the optimized search term "SEDAN" by looking up "midsized car" in a match table and returning the "optimized" search terms associate with this particular entry in the match table (this optimization process is further discussed below).

Continuing with this particular example, the marketing system 120 transmits a pixel to the merchant system 110. In this particular example (and as further discussed herein), the pixel is code placed on the merchant 104's webpages for redirecting a user (customer) visiting the merchant's webpages for a particular purpose (this redirection is during a loading of a webpage and typically unperceivable by a user). In this example, the pixel is for facilitating reading cookies placed on a user's browser and, if certain information is present, facilitating transmission of information regarding the user and/or advertising campaigns the user has engaged to the marketing system 120.

Turning now to the customer 102, in this particular example, the customer 102a wants to buy a new car. The customer 102a, in this particular example, via computing device/browser 14, conducts an Internet search on the advertising platform 140 (e.g., Google®) and uses the search query "SEDAN." Upon receiving the search query "SEDAN" from the customer 102a, in this particular example, the advertising platform 140 displays or transmits the advertisement associated with the advertising campaign of the merchant 104 to the customer 102a (the advertisement and the search term "SEDAN" provided by the marketing system 120, as discussed above). The customer 102a clicks or otherwise accesses the advertisement displayed by the advertising platform 140 to be taken to a website associated with the merchant 104 (the advertisement is part of the merchant 104's advertising campaign as discussed above).

Upon clicking or accessing the advertisement displayed by the advertising platform 140, in this particular example, the adverting platform 140 drops (e.g., associates or stores) a cookie on the customer 102a's browser, where the cookie includes information regarding the advertising campaign, a date, a time, and the particular identifier to be read by the pixel.

Continuing with in this particular example, the customer 102b is taken to the merchant 104's webpage associated with the advertisement. When the customer 102's browser loads the merchant 104's webpage, in this particular example, code associated with the pixel reads the cookie dropped by the advertising platform 140, including the particular identifier. Based upon reading the particular identifier, in this particular example, code associated with the pixel transmits data stored in the cookie to the marketing system 120. As discussed above, the information stored in the cookie (dropped by the advertising platform 140) may include information regarding the advertising campaign, among other information.

In the embodiment shown in FIG. 1, the customer 102b then contacts the merchant 104 based on information on the merchant 104's webpage. In this particular example, the customer 102b calls the merchant 104 via a phone number on the merchant 104's website, submits an electronic form to the merchant 104, and/or chats with a representative of the merchant 104 (via an online chat session). The marketing system 120, in this particular example, captures identifying information from the call (e.g., the customer 102b's phone number), electronic form (e.g., the customer 102b's phone number, name, address, email address, etc.), and/or chat session (information in the transcript of the chat session) of the customer 102b and associates this identifying information with the advertising campaign information received from the cookie (via the pixel—exemplary processes and techniques for capturing this customer identifying information will be further discussed herein). In this way, the marketing system 120 has a record of the customer 102b (who has been identified) interacting with the advertising campaign. This information can be used for analytics and/or matching online advertising campaigns to in-store sales.

Continuing with this particular example, after contacting the merchant 104, the customer 102c goes to the merchant 104's store (e.g., car dealership) to make a purchase. The customer 102c, during the purchase of the car, gives the merchant 104 identifying information such as name, phone number, email address, product purchased, occupation, etc., which the merchant 104 stores in a database (e.g., database 114 and/or 116). The merchant system 110, in this particular example, is then configured to transmit the identifying information of the customer 102c to the marketing system 120. The marketing system 120, in this particular example, matches the identifying information of the customer 102c (e.g., phone number) with the identifying information of the customer 102b received from the call, electronic form, or chat session, and thereby, matches the purchase of the car (car purchase information along with customer identifying information transmitted from the merchant 104 to the marketing system 120) with the advertising campaign (advertising campaign information from the cookie matched to identifying information of the customer from the call, electronic form, or chat session at the merchant system 120). Thus, the marketing system 120, in this particular example, attributes the advertising campaign to the purchase of the car.

As will be understood from the discussions herein, the above particular example is merely exemplary functionality of the systems and methods described herein. For example, the above describes a customer buying a car from a car dealership, but the systems and methods herein may be useful for many (any) merchant online advertising campaigns including, but not limited to, sporting goods, boats and other recreational vehicles, clothing, general retail, services (including repair services), etc.

Exemplary Sequence of Communications Between Environment Components

The components shown in FIG. 1 and discussed herein transmit various data items and information to each other for various purposes. In one particular embodiment, as further discussed herein, the components interact with a marketing system (e.g., marketing system 120) to attribute an online marketing campaign (e.g., sending advertisements to customers) with purchases at a physical location (e.g., a sale of an item or repair of an item). Exemplary communications between various components for attributing an online marketing campaign with in-store purchases are shown in FIG. 2 and discussed below.

Turning now to FIG. 2, the exemplary sequence diagram depicted shows a sequence of communications between a merchant system 110, a marketing system 120, an advertising platform 140, and a computing device/browser 14. As will be understood by one of ordinary skill in the art, this sequence of communications is exemplary only and steps/communications may be added or omitted without departing from the spirit of the sequence as shown. Further, beginning at step (11), the sequence may take alternate paths labeled as "a" and "b" (e.g., (11a), (11b), (14a), (14b)).

Beginning with step (1), the marketing system 120 transmits a pixel to the merchant system 110. In various embodiments, the pixel is intended to be included on one or more websites of the merchant system (e.g., one or more of the merchant's marketing web pages, etc.) for capturing information associated with a user and/or the user's computing device/browser 14 upon receipt of certain information. This "certain information" may be one or more key words or other data that may be stored in a cookie on a browser. As will be further discussed below, in particular embodiments, the pixel is included on webpages that are linked to URLs that are used in marketing campaigns of the merchant.

As will be understood by one of ordinary skill in the art, a "pixel" is a visually-undetectable piece of code (to a human user) that is read like an image (e.g., the pixel of an image) by a browser accessing a particular webpage, directing the browser to a particular URL encoded in the pixel for a particular purpose. As discussed herein, in various embodiments, the marketing system 120 is configured to receive certain data based upon a browser's reading of the pixel.

As will be understood from discussions herein, the system may be configured to utilize other techniques to gather information regarding a user. In particular embodiments, marketing system 120 is configured to receive the information associated with the user from third-parties (e.g., from the advertising platform 140 or the merchant system 110). In further embodiments, the marketing system 120 is configured to receive the information associated with the user via forms, surveys, and other information filled out by the user. In still further embodiments, the marketing system 120 is configured to receive the information associated with the user via a script included on the merchant system 110's website, other than a pixel.

The pixel may be transmitted to the merchant system 110 in any suitable way. In particular embodiments, the pixel is transmitted by the marketing system 120 directly to the merchant system 110 and the merchant system 110 adds the pixel to one or more merchant websites. In some embodiments, the system is configured to transmit the pixel to a third-party (not shown) that manages the websites of the merchant and this third-party adds the pixel to the one or more merchant websites.

Continuing with step (2), the merchant system 110 transmits advertising campaign information to the marketing system 120. As further discussed herein, the advertising campaign information may include any suitable information, including, but not limited to, one or more key words or search terms (that a customer may use to query a search engine), one or more URLs that point to at least one webpage of the merchant (e.g., for use when displaying an advertisement as part of the marketing campaign), and any other suitable information (dates, name of merchant, name of marketer, etc.). The merchant system 110 may transmit the advertising campaign information to the marketing system 120 in any suitable way. In various embodiments, the merchant system 110 transmits, and the marketing system 120 receives the campaign information via email, suitable API, etc.

At step (3), the marketing system 120 transforms any key words and/or search terms included in the advertising campaign information into optimized and/or expanded search terms for use in the marketing campaign (e.g., the marketing system 120 may translate the search term "Ford® Focus™" into Ford®, "Volkswagon® Jetta™," "Honda® Civic™," "Ford® Focus™ 2015," etc.). In various embodiments, the marketing system 120 may add additional information to the search term, such as geographic location (e.g., "Ford® Focus™ Atlanta"), etc.

The marketing system 120 may be configured to transform the key words and/or search terms in any suitable way. In particular embodiments, the system is configured to search a database for a particular search term/key word included in the advertising campaign information and return one or more optimized or expanded search terms associated with the search term/key word in the database. In some embodiments, the system is configured to transform the key words and/or search terms by submitting the key words and/or search terms into an optimization engine, which returns optimized/expanded key words based on search probabilities and/or based on a continuously updated (e.g., automatically, autonomously) database of optimized key words.

At step (4), the marketing system transmits (e.g., by upload) advertising campaign information to the advertising platform 140. The advertising campaign information may include any suitable advertising campaign information, such as the optimized and/or expanded search terms associated with the one or more merchant website URLs, a marketing campaign identifier, information associated with the marketing system, a date, a time, etc.

As will be understood by one of ordinary skill in the art, the advertising platform 140, in various embodiments, will present ads to a user based on receiving particular information. In some embodiments, the advertising platform 140 is a search engine (e.g., Google®, Bing®, etc.) that presents ads in response to a user's search query. For example, if a user queries the search engine for "Ford Focus," the search engine may return search results based on this search as well as present advertisements associated with receiving this term.

At step (5), a user at a computing system/browser 14 submits a search query to the advertising platform 140 (e.g., the user types "Ford® Focus™" into a search field of the advertising platform 140 and selects "search" or presses the enter key). At step (6), the advertising platform 140 matches the search query with key words/search terms submitted in various advertising campaigns, such as the advertising campaign uploaded to the advertising platform 140 by the marketing platform 120, and, based on the matching the search query with the key words/search terms, the advertising platform 140 displays ads on the computing system/browser 14.

At step (7), a user at the computing system/browser 14 selects an ad displayed by the advertising platform 140 (displayed based on an advertising campaign). In response to the user selecting the ad, at step (8), the advertising platform 140 drops a cookie on the computing system/browser 14. The cookie may include any suitable information, including advertising campaign information, information about what ad the user clicked on, and/or information regarding a date, time, etc. that the cookie was dropped. In various embodiments, the cookie includes information, including certain information or data, that when read by the pixel discussed in step (1), the marketing system 120 collects certain data from the computing system/browser 14.

At step (9), in response to the user selecting the ad (step (7)), the computing system/browser 14 requests information from the URL associated with the ad. In the embodiment shown in FIG. 2, the URL is associated with the merchant system 110. Thus, in this embodiment, the computing system/browser 14 requests information associated with the URL from the merchant system 110. At step (10) the merchant system 110 sends data back to the computing system/browser 14 in response to receiving the request for information via the URL. In the embodiment shown, the data sent by the merchant system 110 to the computing system/browser 14 is in the form of a website to be read by the computing system/browser 14. In particular, the merchant website sent by the merchant system 110 may include the pixel discussed at step 1.

As will be understood by one of ordinary skill in the art, the user may take any action or no action upon accessing the merchant website. In various embodiments, the user may view a phone number associated with the merchant website and, if the computing device/browser 14 is operatively connected to a phone system, may select the phone to directly call the number displayed. This embodiment is shown in FIG. 2 and discussed below in relation to steps with the letter "a." In alternate embodiments, the user may access, fill out, and submit an electronic form (e.g., to be further contacted by the merchant and/or to receive further information). This form submission embodiment is shown in FIG. 2 and discussed below in relation to steps with the letter "b".

At step (11*a*), the user selects a phone number link displayed on the merchant website. In response to selecting the phone number link, the computing system/browser 14 requests data from the merchant system 110, including accessing the phone number associated with the link.

In response to receiving the request for the data including the phone number, the merchant system 110, at step (12a) transmits data to the computing system/browser 14 that includes the pixel from step (1).

In response to receiving the pixel, the computing system/browser 14, at step (13a), requests data associated with the URL associated with the pixel. In various embodiments, the URL associated with the pixel directs the computing system/browser 14 to the marketing system 120, where the marketing system 120 changes the phone number to be called by the user and collects the data associated with the computing system/browser 14 (step (14a)). In particular embodiments, the marketing system 120 changes the phone number to a phone number that connects the user to the original intended recipient of the call, but allows the marketing system 120 to listen in on the call and/or gather other data about the call, including the phone number associated with the computing system/browser 14 making the call.

At step (15a) the marketing system 120 sends the changed phone number to the computing device/browser 14. At step (16a), the computing device/browser 14 accesses the changed phone number to complete the call, where data from the call is recorded by both the marketing system 120 and the merchant system 110 through the changed phone number.

At step (17a), the marketing system 120 matches the data gathered regarding the call (e.g., including the phone number associated with the computing device/browser 14) with the data associated with the computing system/browser 14, which may include the information stored in the cookie dropped by the advertising platform at step (8). The system further stores this matched information in one or more databases for matching to in-store purchases at a later date.

As will be understood from discussions herein, the information stored in the cookie may include information regarding the advertising campaign. Thus, in various embodiments, the marketing system matching a phone number or other identification of the computing system/browser 14 with cookie information (and therefore advertising campaign information) may enable the marketing system 120 to match a user that later makes a purchase and discloses their phone number during the sale to the advertising campaign.

Turning to the form submission sequence shown in FIG. 2, denoted by sequence numbers with a "b" (continuing from step (10)), the user at the computing device/browser 14 elects to fill out an electronic form by selecting a link to access the form. The user may elect to fill out an electronic form for any suitable purpose. In one embodiment, the user fills out an electronic form as a request for more information regarding a particular product (car, retail item, etc.). In some embodiments, the user fills out an electronic form to sign up for an electronic mailing list, etc. The request for the electronic form is transmitted from the computing device/browser 14 to the merchant system 110 (step (11b)).

At step (12b), the merchant system transmits a webpage including the electronic form and the pixel. At step (13b), the user fills out the electronic form and includes any suitable information (name, date, phone number, email address, subject matter, etc.) and selects a link to submit the form. The pixel, or the URL associated with the pixel, captures the data entered into the form by the user. At step (14b), the user submits the electronic form and the form data is transmitted to the marketing system 120 via the URL associated with the pixel and to the merchant system 110.

At step (15b), the marketing system 120 matches the data gathered from the electronic form (e.g., including a phone number, name, address, email address, etc. associated with the computing device/browser 14) with the data associated with the computing system/browser 14 (e.g., from the cookie data), which may include the information stored in the cookie dropped by the advertising platform at step (8). The system further stores this matched information in one or more databases for matching to in-store purchases at a later date.

Exemplary Marketing Platform Attribution Process

The marketing system 120, as shown and described in the FIGS. 1 and 2 is configured to carry out various processes described herein. In particular embodiments, the marketing system is configured to carry out the process described in FIG. 3.

As shown in FIG. 3, the exemplary process begins with step 302, where the system is configured to receive at least one term and at least one merchant universal resource locator (URL) for an online advertising campaign. The system is configured to receive the at least one term and the at least one merchant URL from any suitable source. In various embodiments, as described in relation to FIG. 1, the system is configured to receive the at least one term and the at least one merchant URL from a merchant and/or merchant system (e.g., merchant system 110). In some embodiments, the system is configured to receive the at least one term and the at least one merchant URL from another source, such as from an advertiser, third-party agent, etc. In further embodiments, the system may be configured to receive the at least one term from a different source than the at least one URL (e.g., the system may be configured to receive the at least one URL from an advertiser that created an advertisement (e.g., "creative") and the at least one term from the merchant).

The at least one term may be any suitable term. According to particular embodiments (including the embodiment discussed in relation to FIG. 1), the at least one term is a key word or search term for an advertising campaign used for targeting potential customers that search for this key word or search term. In at least one embodiment, the at least one term is a term for use with the URL (e.g., the at least one term is a term that will be shown to a potential customer hyperlinked to the URL). In some embodiments, the at least one term is related to a particular industry, product, service, good, company (including a competitor), brand, design, etc.

The at least one URL may be any suitable URL for serving an advertisement. As will be understood from the discussions herein, when an advertisement is served by an advertising platform (or via another suitable platform) the advertisement may show the site or resource associated with the URL or may provide a link to the URL. In various embodiments, the URL is an address to website associated with a merchant. In some embodiments, the URL is an address associated with an advertiser, third party, etc.

At step 304, the system is configured to transform the at least one term into one or more search terms optimized for online searching. As discussed above in relation to FIG. 2, the system may be configured to transform the at least one term into one or more search terms optimized for online searching in any suitable way. In a particular embodiment, the system is configured to transform the at least one term into one or more search terms optimized for online searching by finding the at least one term (and/or equivalent terms) in a look-up table including further terms or optimized terms. In at least one embodiment, the system is configured for adding phonetic equivalents to the at least one term and/or for expanding the one or more search terms to include misspelling of the at least one term. In further embodiments, the system is configured to transform the at least one term into one or more search terms by adding at least one term associated with a competitor associated with the at least one term (e.g., if the at least one term is "charcoal" the system may be configured to transform "charcoal" into "charcoal," "charcoals", "charcoal grill," "gas grill," and/or "propane grill"). In still further embodiments, the system may be configured to transform the at least one term into one or more search terms by adding brand names to the at least one term (e.g., if the at least one term is "soccer cleats" the system may be configured to transform "soccer cleats" into "soccer cleats" and "Nike").

At step 306, the system is configured to associate the one or more search terms with the at least one merchant URL. In various embodiments, the system is configured to associate the one or more search terms with the at least one merchant URL by saving the one or more search terms with the at least one merchant URL in a table where the particular columns or rows of the table storing the one or more search terms and the at least one merchant URL are linked within the system (e.g., associated). In some embodiments, the system is configured to associate the one or more search terms with the at least one merchant URL by including a link with the one or more search terms and/or at least one merchant URL, wherein the link points to the one or more search terms, the at least one merchant URL, or both. In further embodiments, the system is configured to associate the one or more search terms with the at least one merchant URL by appending an identifier on each of the one or more search terms (and/or strings including the one or more search terms) and/or the at least one merchant URL.

At step 308, the system is configured to transmit the one or more search terms, the at least one merchant URL, and particular identification data to a third-party advertising platform for inclusion in a cookie to be placed on one or more user's browsers. In various embodiments the system is configured to transmit the one or more search terms, the at least one merchant URL, and particular identification data to the third-party advertising platform by uploading the one or more search terms, the at least one merchant URL, and particular identification data to a third-party advertising platform via a particular file upload process through a suitable API. In some embodiments, the system is configured to transmit the one or more search terms, the at least one merchant URL, and particular identification data to the third-party advertising platform via email protocol, by combining the one or more search terms, the at least one merchant URL, and particular identification data into a single file and transmitting the single file to the third-party advertising platform.

The particular identification data may include any suitable data. In various embodiments, the particular identification data includes data identifying the advertising platform (e.g., a name or identifier associated with the advertiser), a date, a time, a bid amount for the various search terms, an identifier associated with the advertising platform, with the advertising campaign (e.g., the identify the campaign at a later date, etc.).

The information transmitted by the system for inclusion in the cookie to be placed on one or more browsers may be encoded and/or formatted in the cookie in any suitable way. In particular embodiments, this information is formatted such that it can be read and the identifying particular information can be recognized by a pixel.

As will be understood by one of ordinary skill in the art, a "pixel" is a single pixel-sized piece of code that is read as an image by a browser. As will further be understood by one of ordinary skill in the art, when an image, such as a pixel, is read by a browser (during the loading of a webpage), the browser follows a link associated with the pixel to retrieve the image associated with the pixel. In many cases, including in embodiments described herein, the pixel does not send an image to the browser, but incorporates some other functionality, such as reading cookies, etc.

At step 310, the system is configured to transmit, to a computing system associated with the merchant, a pixel for identifying the particular identification data, wherein upon identification of the particular identification data stored on a browser reading the pixel, the pixel is configured to facilitate transmission of pixel data. In various embodiments, the system is configured to transmit the pixel to the computing system associated with the merchant by transmitting the pixel to one or more webpages of the merchant (e.g., such that the pixel resides on the one or more webpages). In some embodiments, the system is configured to transmit the pixel to the computing system associated with the merchant via another mechanism such as via email, via an API, through a third-party, etc.

As further discussed herein, once the pixel is on one or more webpages of the merchant, code associated with the pixel reads cookies dropped on browsers that visit the one or more webpages of the merchant. In various embodiments, the cookie includes the particular identification data and other information is dropped on the browser of a potential customer (e.g., customer 102) upon the potential customer selecting an advertisement associated with the merchant. In various embodiments, the advertisement associated with the merchant includes a link to the one or more webpages of the merchant that include the pixel.

The code associated with the pixel may be configured to gather other information. In various embodiments, the code associated with the pixel is configured to read (e.g., "listen") any data input by a user into an electronic form associated with the one or more webpages of the merchant that include the pixel.

Further, the code associated with the pixel may be configured to change a feature of the one or more webpages of the merchant that include the pixel. In a particular embodiment, the code associated with the pixel is configured to change a link to a phone number displayed on a webpage upon the code associated with pixel reading the particular identification data. In this embodiment (and others), as discussed herein, the code associated with the pixel changes the phone number on the webpage to a phone number associated with the system (e.g., from a number associated with the merchant). Continuing with this embodiment, when a potential customer calls the changed phone number on the webpage, the information associated with the call (e.g., the caller ID, the voice record of the call, etc.) are transmitted to both the merchant system and the marketing system via this changed number.

As discussed herein, upon reading a cookie that includes the particular identification data, the code associated with the pixel is configured to transmit the pixel data to the system. Turning to step 312, the system is configured to receive the pixel data from a particular browser, the pixel data comprising information identifying a particular user, an indication of the third-party advertising platform, and an indication of the at least one merchant URL. The pixel data may further include any suitable data from a cookie or associated with a browser and/or a potential customer that is gathered by the code associated with the pixel. In various embodiments, the pixel data includes the particular identification data, data identifying the advertising campaign, Google® UTM data, and/or other tracking data.

The information identifying the particular user may include a name, phone number, email address, etc. of the potential customer associated with the particular browser. In various embodiments, the information identifying the particular user is read by the code associated with the pixel from a form submitted by the particular user (e.g., a form requesting to be contacted about a product, etc.). In some embodiments, the information identifying the particular user is read by the code associated with the pixel based on a phone number called by the particular user, where the phone number is directed to the merchant.

At step 314, the system is configured to receive DMS data from a merchant DMS database, the DMS data including information identifying purchasing users that have made a purchase from the merchant. As further discussed herein, the system, in various embodiments, is configured to receive or retrieve data from various merchant databases. In some embodiments, the system is configured to receive data from a merchant document management system (DMS) database. In particular embodiments, as further discussed herein, a merchant may include information regarding sales, services, etc. in a DMS database.

The system may be configured to receive the DMS data from the merchant DMS database in any suitable way. In particular embodiments, the system is configured to retrieve the DMS data from the DMS database when needed or periodically. In some embodiments, the system is configured to receive the DMS data from the DMS data on regular intervals or when a new record is entered into the merchant DMS database. In further embodiments, the system is configured to receive copies of the merchant DMS database from the merchant at regular intervals.

The information identifying purchasing users that have made a purchase from the merchant may include any suitable information. In particular embodiments, the information identifying purchasing users includes phone numbers, email addresses, physical addresses, names, purchases, occupations, etc. that may identify users that have made a purchase from the merchant. As will be understood from discussions herein, a "purchase" includes a purchase of goods, purchase of services, purchase of repair parts, purchase of consulting time, purchase of particular goods, etc.

At step 316, the system is configured to match the pixel data to a particular purchasing user from the DMS data based on the information identifying the particular user, indicating that the particular purchasing user and the particular user are the same user. As discussed above, in particular embodiments, the pixel data includes information identifying the particular user (e.g., name, phone number, email address, etc.) and the DMS data includes information identifying purchasing users (e.g., name, phone number, email address, etc.). In particular embodiments, the system is configured to match a common identifier of the pixel data and the DMS data (e.g., name, phone number, email address, etc.) and thereby matching the particular user and the particular purchasing user.

Based on matching the particular user and the particular purchasing user, the system, in various embodiments, is configured to match other information to the particular purchasing user, including advertising campaign data, Google® UTM data, and any other suitable information included in the pixel or DMS data about the particular purchasing user.

At step 318, the system is configured to provide an indication of the purchase made by the particular user and the pixel data to the computing system associated with the merchant. As will be understood from discussions herein, the system may be configured to provide any suitable information regarding the particular user/particular purchasing user to the computing system associated with the merchant, including, but not limited to, information regarding the advertising campaign, etc.

Other Exemplary Marketing Platform Processes

Alternate embodiments and functionalities of the system and methods disclosed herein follow. More information regarding these alternate embodiments and functionalities can be found in U.S. Provisional Patent Application No. 62/052,942, filed Sep. 19, 2014, entitled, "PROCESS AND SYSTEM FOR DIGITAL LEAD SOURCING," incorporated herein by reference in its entirety.

Lead Sourcing

As discussed above, the systems and methods described herein may include receiving potential customer information based on a pixel (or another suitable mechanism). The potential customer information is, in various embodiments, matched to customer purchase data in a merchant's DMS database. However, in alternate embodiments, the system and methods may track potential customers (e.g., leads) that submit information and/or visit the merchant's website) and transmit this data to the merchant's DMS or CMS system.

Advanced Reporting

In an alternate embodiment, the systems and methods described herein may be used for advanced reporting, including an actionable dashboard with natural language summaries and action items based off of tracking, advertising campaigns, and purchases attributed to advertising campaigns. This dashboard may receive complex data from Google® Analytics, Dataium™, merchants, and/or other third-parties.

In further embodiments, the actionable dashboard may provide data to a merchant, such as opportunities (calls/leads), costs per opportunity, costs per click (e.g., costs associated with advertising campaigns), adjustments to advertising campaigns, budget, current ROI, marketing shopping activity (aggregated from multiple merchants), changes in website traffic, market share, conversions (assisted and viewthrough). In still further embodiments, the actionable dashboard may include video pre-roll features and/or operations summaries and/or email alert features.

Real Time Offers

In another alternate embodiment, the system may be configured to create and/or facilitate distribution of a limited time (e.g., six-month) cookie to track multiple campaigns with which a customer has engaged (e.g., multiple ads the customer has accessed/clicked). This six-month cookie (or any cookie as described herein) may enable the system to transmit "real time offers" to customers. Briefly described, in a particular embodiment, the system may be configured to add a pixel (as described herein) to a merchant's webpage. Continuing with this particular embodiment, code associated with pixel reads cookies on a customer's browser (six-month cookie or otherwise) and determines which campaigns the customer has engaged and then transmits an advertisement to the customer at the time the customer's browser loads a merchant's webpage based on the cookie information. In this alternate embodiment, the system may be configured to, upon determining with which campaigns the customer has engaged, deliver a pop-up advertisement to the customer to offer the customer a deal associated with at least one of the campaigns the customer has engaged.

Exemplary System Architecture

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable nonvolatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed systems and methods may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed systems and methods are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer (or computers) that affects many aspects of the described processes will typically operate in a networked environment (e.g., one or more networks 12 as shown in FIG. 1) using logical connections to one or more remote computers or data sources, which are described further below. Remote computers may be another personal computer, a server (e.g., any suitable one or more server shown in FIG. 1), a router, a network PC, a peer device or other common network node, and typically include many or all of the elements described above relative to the main computer system in which the systems and methods are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the systems and methods described herein are connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

In addition to the above, various technology platforms may be leveraged, including, but not limited to: Amazon™ AWS™ databases, mi725.com (script), Authenicom™ (DMS), Marchex™ (call tracking).

CONCLUSION

Many modifications and other embodiments of the systems and methods herein may come to mind to one skilled in the art to which these systems and methods pertain having the benefit of the teachings presented in the foregoing descriptions and the associated drawings. While examples discussed above cover the use of the systems and methods herein in the context a content management service, the systems and methods herein may be used in any other suitable context. Therefore, it is to be understood that the systems and methods herein is not to be limited to the specific embodiments disclosed and that modifications and other embodiments are intended to be included within the scope of the appended claims. Although specific terms are employed herein, they are used in a generic and descriptive sense only and not for the purposes of limitation.

What is claimed is:

1. A computer system for linking purchases at a physical location with an online marketing campaign, the computer system comprising:
    at least one database for storing online advertising campaign information; and
    at least one processor operatively connected to: a) the at least one database, b) a third-party online advertising platform, c) a merchant database, and d) a computing system associated with a merchant, wherein the at least one processor is operative to:
        receive at least one term and at least one merchant URL for an online advertising campaign;
        transmit the at least one term, the at least one merchant URL, and particular identification data to a third-party advertising platform for inclusion in a cookie to be placed on one or more user's browsers;
        transmit, to the computing system associated with the merchant, a pixel for identifying the particular identification data, wherein upon identification of the particular identification data stored on a browser including the cookie and reading the pixel, the pixel is configured to facilitate transmission of pixel data to the at least one processor;
        receive the pixel data from a particular browser, the pixel data comprising information identifying a particular user based on the particular user's interactions with the online advertising campaign captured by the cookie, an indication of the third-party advertising platform, and an indication of the at least one merchant URL, wherein the information identifying the particular user comprises at least the particular user's name, phone number, and email address;
        receive data from the merchant database, the data including user-provided identification information identifying purchasing users that have made a purchase from the merchant, wherein the user-provided identification information comprises data obtained from the purchasing users by the merchant at the physical location of the merchant in response to the purchasing users making the purchases while physically present at the physical location of the merchant;
        match the pixel data to a particular purchasing user from the data based on the user-provided identification information identifying the particular user, indicating that the particular purchasing user and the particular user are the same user, wherein a match comprises determining a common identifier between the pixel data and the user-provided identification information, and wherein the user-provided identification information comprises the particular purchasing user's phone number, email address, physical address, name, purchased item, and occupation, provided to the merchant during a purchase made by the particular purchasing user at the physical location of the merchant;
        in response to matching the pixel data to the particular purchasing user, match additional information to the particular purchasing user, wherein the additional information comprises urchin tracking model data and other data not directly provided from the particular purchasing user to the merchant at the physical location of the merchant;
        provide an indication of the purchase made by the particular user and the pixel data to the computing system associated with the merchant;
        transmit the indication of the purchase made by the particular user to the third-party advertising platform to be included in a real-time offer cookie, wherein the real-time offer cookie is placed on the particular user's browser; and
        upon identification by the pixel of the real-time offer cookie on the particular user's browser reading the pixel, the pixel is configured to initiate transmission of one or more real-time purchasing offers to the particular user based on the indication of the purchase, wherein the transmission is initiated within a limited timeframe corresponding to a predetermined amount of time based on the real-time offer cookie.

2. The computer system of claim 1, wherein the information identifying the particular user comprises a phone number of the particular user used to call a number included on the website associated with the at least one merchant URL.

3. The computer system of claim 1, wherein the at least one processor is further operatively connected to a merchant CRM database and the at least one processor is further operative to, upon matching the pixel data to the particular purchasing user from the data based on the user-provided identification information identifying the particular user, provide an indication of the purchase made by the particular user to the merchant CRM database, wherein the merchant CRM database previously received the information identifying the particular user from the computing system associated with the merchant.

4. The computer system of claim 1, wherein the at least one processor is further operative to:
    transform the at least one term into one or more search terms optimized for online searching; and
    associate the one or more search terms with the at least one merchant URL.

5. The computer system of claim 1, wherein the pixel data further comprises information identifying the particular user captured by the pixel in response to the particular user populating an electronic form associated with the merchant via the particular browser, and wherein the computing system associated with the merchant transmits a webpage including the electronic form and the pixel to the particular browser.

6. A method for linking purchases at a physical location with an online marketing campaign, the method comprising:
    providing at least one database for storing online advertising campaign information;

providing at least one processor operatively connected to: a) the at least one database, b) a third-party online advertising platform, c) a merchant database, and d) a computing system associated with a merchant, wherein the at least one processor is operative to:

receive at least one term and at least one merchant URL for an online advertising campaign;

transmit the at least one term, the at least one merchant URL, and particular identification data to a third-party advertising platform for inclusion in a cookie to be placed on one or more user's browsers;

transmit, to the computing system associated with the merchant, a pixel for identifying the particular identification data, wherein upon identification of the particular identification data stored on a browser including the cookie and reading the pixel, the pixel is configured to facilitate transmission of pixel data to the at least one processor;

receive the pixel data from a particular browser, the pixel data comprising information identifying a particular user based on the particular user's interactions with the online advertising campaign captured by the cookie, an indication of the third-party advertising platform, and an indication of the at least one merchant URL, wherein the information identifying the particular user comprises at least the particular user's name, phone number, and email address;

receive data from the merchant database, the data including user-provided identification information identifying purchasing users that have made a purchase from the merchant, wherein the user-provided identification information comprises data obtained from the purchasing users by the merchant at the physical location of the merchant in response to the purchasing users making the purchases while physically present at the location of the merchant;

match the pixel data to a particular purchasing user from the data based on the user-provided identification information identifying the particular user, indicating that the particular purchasing user and the particular user are the same user, wherein a match comprises determining a common identifier between the pixel data and the user-provided identification information, and wherein the user-provided identification information comprises the particular purchasing user's phone number, email address, physical address, name, purchased item, and occupation, provided to the merchant during a purchase made by the particular purchasing user at the physical location of the merchant;

in response to matching the pixel data to the particular purchasing user, match additional information to the particular purchasing user, wherein the additional information comprises urchin tracking model data and other data not directly provided from the particular purchasing user to the merchant at the physical location of the merchant;

provide an indication of the purchase made by the particular user and the pixel data to the computing system associated with the merchant;

transmit the indication of the purchase made by the particular user to the third-party advertising platform to be included in a real-time offer cookie, wherein the real-time offer cookie is placed on the particular user's browser; and upon identification by the pixel of the real-time offer cookie on the particular user's browser reading the pixel, the pixel is configured to initiate transmission of one or more real-time purchasing offers to the particular user based on the indication of the purchase, wherein the transmission is initiated within a limited timeframe corresponding to a predetermined amount of time based on the real-time offer cookie.

7. The method of claim 6, wherein the information identifying the particular user comprises user information submitted by the particular user via an online form.

8. The method of claim 6, wherein the information identifying the particular user comprises a phone number of the particular user used to call a number included on the website associated with the at least one merchant URL.

9. The method of claim 6, wherein the at least one processor is further operatively connected to a merchant CRM database and the at least one processor is further operative to, upon matching the pixel data to the particular purchasing user from the data based on the user-provided identification information identifying the particular user, provide an indication of the purchase made by the particular user to the merchant CRM database, wherein the merchant CRM database previously received the information identifying the particular user from the computing system associated with the merchant.

10. The method of claim 6, wherein the at least one processor is further operative to:
transform the at least one term into one or more search terms optimized for online searching; and
associate the one or more search terms with the at least one merchant URL.

11. A computer system for linking purchases at an automobile dealership physical location with an online marketing campaign, the computer system comprising:

a plurality of databases including: a) at least one database for storing online advertising campaign information, b) at least one database for storing existing customer information, and c) at least one database for storing potential customer information; and at least one processor operatively connected to: a) each of the plurality of databases, b) a third-party online advertising platform, c) a merchant customer relationship management ("CRM") database, d) a document management system ("DMS") database, and e) a computing system associated with a merchant, wherein the merchant is a physical automobile dealership, and wherein the at least one processor is operative to:

receive at least one term and at least one merchant URL for an online advertising campaign, wherein the at least one term comprises characteristics relating to automobiles;

transmit the at least one term, the at least one merchant URL, and particular identification data to a third-party advertising platform for inclusion in a cookie to be placed on one or more user's browsers, wherein the third-party advertising platform places the cookie on the one or more user's browsers in response to: a) matching search queries entered into the one or more user's browsers with the at least one term, b) displaying, on the one or more user's browsers, an advertisement linked to the at least one merchant URL and associated with the at least one term, and c) the advertisement being selected on the one or more user's browsers;

transmit, to the computing system associated with the merchant, a pixel for identifying the particular identification data, wherein the computing system associated with the merchant is configured to further transmit the at least one merchant URL and the pixel to a particular browser including the cookie and associated with a particular user of the one or more users in response to the particular user selecting to receive additional information about the advertisement;

receive pixel data from the particular browser upon identification of the particular identification data stored on the particular browser including the cookie and reading the pixel, the pixel data comprising information identifying the particular user based on the particular user's interactions with the online advertising campaign captured by the cookie, an indication of the third-party advertising platform, and an indication of the at least one merchant URL, wherein the information identifying the particular user comprises at least the particular user's name, phone number, and email address, and wherein the information identifying the particular user is obtained by at least one of: the particular user filling out an electronic form to include the information identifying the particular user, and the particular user providing the information via telephone, and wherein the information identifying the particular user is stored in the at least one database for storing potential customer information;

receive data from the merchant CRM database, the data including user-provided identification information identifying purchasing users that have made an automobile purchase from the physical automobile dealership associated with the merchant, wherein the purchasing users made the automobile purchases from the merchant while physically present at the physical automobile dealership;

match the pixel data to a particular purchasing user from the data based on the user-provided identification information identifying the particular user, indicating that the particular purchasing user and the particular user are the same user, wherein a match comprises determining a common identifier between the pixel data and the user-provided identification information, and wherein the user-provided identification information comprises the particular purchasing user's phone number, email address, physical address, name, purchased item, and occupation, provided to the merchant during a purchase made by the particular purchasing user at the physical location of the merchant;

in response to matching the pixel data to the particular purchasing user, match additional information to the particular purchasing user, wherein the additional information comprises urchin tracking model data and other data not directly provided from the particular purchasing user to the merchant at the physical location of the merchant;

provide an indication of the automobile purchase made by the particular user and the pixel data to the computing system associated with the merchant;

transmit the indication of the automobile purchase made by the particular user to the third-party advertising platform to be included in a real-time offer cookie, wherein the real-time offer cookie is placed on the particular user's browser; and upon identification by the pixel of the real-time offer cookie on the particular user's browser reading the pixel, the pixel is configured to initiate transmission of one or more real-time purchasing offers to the particular user based on the indication of the automobile purchase, wherein the transmission is initiated within a limited timeframe corresponding to a predetermined amount of time based on the real-time offer cookie.

12. The computer system of claim 11, wherein the merchant database is a document management system ("DMS") database for storing information regarding automobile related sales.

13. The computer system of claim 12, wherein the wherein the at least one processor is further operatively connected to a merchant customer relationship management ("CRM") database and the at least one processor is further operative to, upon matching the pixel data to the particular purchasing user from DMS data based on the information identifying the particular user, provide an indication of the automobile purchase made by the particular user to the merchant CRM database, wherein the merchant CRM database previously received the information identifying the particular user from the computing system associated with the merchant.

14. The computer system of claim 13, wherein the merchant CRM database and the DMS database are physically separated and do not share information.

15. A computer system for linking purchases at a physical location with an online marketing campaign, the computer system comprising:

at least one database for storing online advertising campaign information; and at least one processor operatively connected to: a) the at least one database, b) a third-party online advertising platform, c) a merchant database, and d) a computing system associated with a merchant, wherein the at least one processor is operative to:

receive at least one term and at least one merchant URL for an online advertising campaign;

transmit the at least one term, the at least one merchant URL, and particular identification data to a third-party advertising platform for inclusion in a cookie to be placed on one or more user's browsers;

transmit, to the computing system associated with the merchant, a pixel for identifying the particular identification data, wherein upon identification of the particular identification data stored on a browser including the cookie and reading the pixel, the pixel is configured to facilitate transmission of pixel data to the at least one processor;

receive the pixel data from a particular browser, the pixel data comprising information identifying a particular user based on the particular user's interactions with the online advertising campaign captured by the cookie, an indication of the third-party advertising platform, and an indication of the at least one merchant URL, wherein the information identifying the particular user comprises at least the particular user's name, phone number, and email address;

receive data from the merchant database, the data including user-provided identification information identifying purchasing users that have made a purchase from the merchant, wherein the user-provided identification information comprises data obtained from the purchasing users by the merchant at the physical location of the merchant in response to the purchasing users making the purchases while physically present at the location of the merchant;

match the pixel data to a particular purchasing user from the data based on the user-provided identification information identifying the particular user, indicating that the particular purchasing user and the particular user are the same user, wherein a match comprises determining a common identifier between the pixel data and the user-provided identification information, and wherein the user-provided identification information comprises the particular purchasing user's phone number, email address, physical address, name, purchased item, and occupation, provided to the merchant during a purchase made by the particular purchasing user at the physical location of the merchant;

in response to matching the pixel data to the particular purchasing user, match additional information to the particular purchasing user, wherein the additional information comprises urchin tracking model data and other data not directly provided from the particular purchasing user to the merchant at the physical location of the merchant; and provide an indication of the purchase made by the particular user and the pixel data to the computing system associated with the merchant.

* * * * *